United States Patent [19]
Berends

[11] 3,810,663
[45] May 14, 1974

[54] VEHICULAR BAG HOIST

[75] Inventor: Howard P. Berends, Fruitport, Mich.

[73] Assignee: Holland Hitch Company, Holland, Mich.

[22] Filed: Oct. 25, 1972

[21] Appl. No.: 300,642

Related U.S. Application Data
[62] Division of Ser. No. 103,689, Jan. 4, 1971.

[52] U.S. Cl............ 280/425, 298/22 AE, 105/368 S
[51] Int. Cl............................................. B62d 53/08
[58] Field of Search................ 280/425; 298/22 AE; 105/368 S; 254/10 R, 10 C, 124

[56] References Cited
UNITED STATES PATENTS
1,990,700  2/1935  Kinne.............................. 280/425 R
2,587,067  2/1952  Sachtleber...................... 254/10 C X
3,380,758  4/1968  Granning......................... 280/425 R Primary Examiner—Leo Friaglia
Assistant Examiner—Randall A. Schrecengost
Attorney, Agent, or Firm—Price, Heneveld, Huizenga & Cooper

[57] ABSTRACT

An elevatable vehicular hauling assembly employing expandable hoisting bellows, a pair of sliding parallelogram linkages, and vertical alignment retention and position control means interlinked therewith.

4 Claims, 6 Drawing Figures

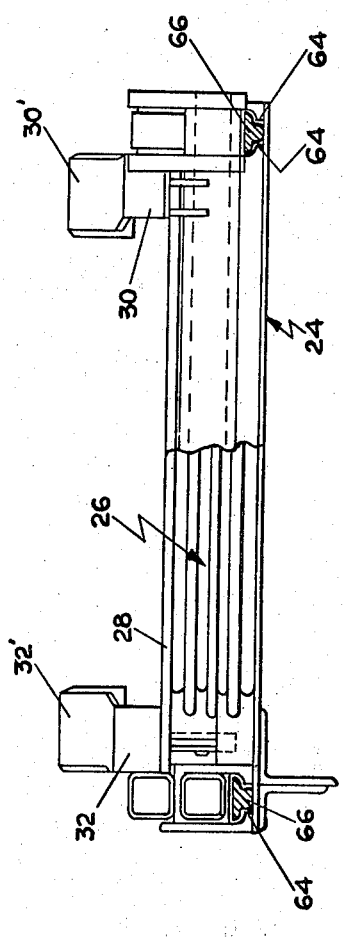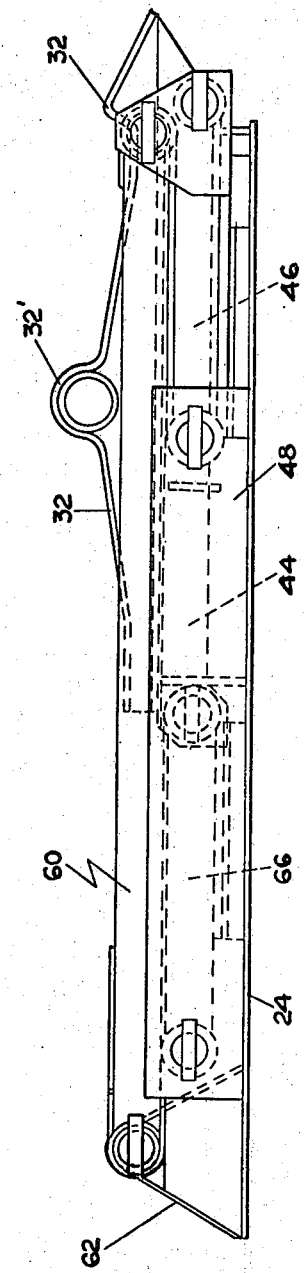

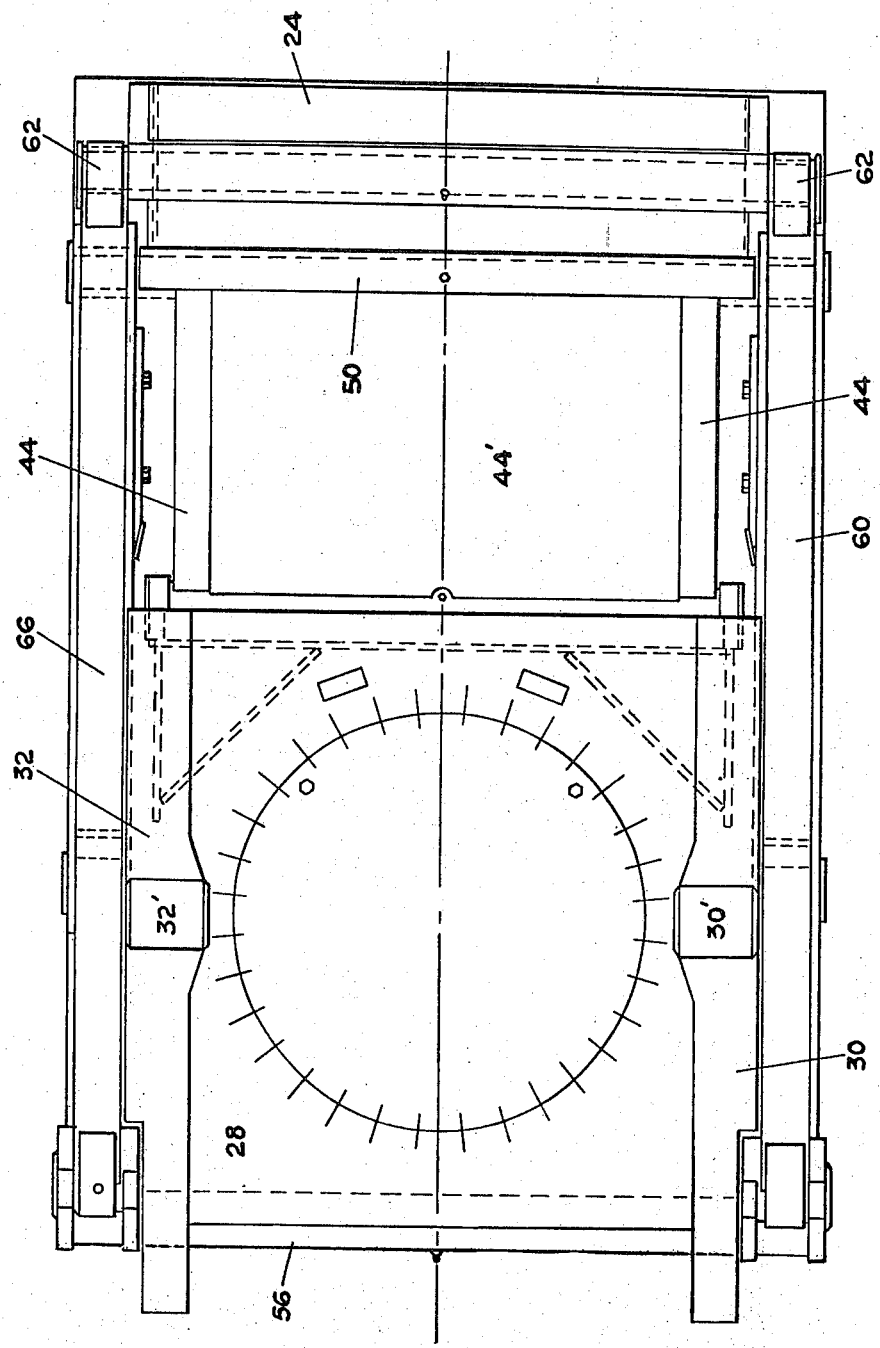

VEHICULAR BAG HOIST

This is a division of application Ser. No. 103,689, filed Jan. 4, 1971.

BACKGROUND OF THE INVENTION

This invention relates to vehicular hauling equipment, and more particularly to a hoistable vehicular load support assembly.

Versatility of function is becoming increasingly important for haulage vehicles. One feature considered particularly advantageous is capacity for elevation of the load support structure of a hauling vehicle as a unit. For example a hoistable, load supporting fifth wheel on a truck tractor allows rapid yard work since the front end of semi-trailer can readily be lifted sufficiently to lift the landing gear off the ground. Consequently, various structures have been proposed, and some adopted, employing inflatable bellows units to hoist fifth wheel platforms. However, too frequently, there is a practical limit of elevation that can be achieved. This usually results from limited hoisting capacity, limited expansibility of the hoisting units, or more frequently, instability of the elevated structure under load.

SUMMARY OF THE INVENTION

This invention employs a combination of parallelogram linkages, position control means, and hoisting bellows between the vehicular support frame and load engaging elevator platform to achieve a novel haulage vehicle assembly. Loads can be elevated to substantial heights, yet with stability, by the novel structure. The elevator platform does not move significantly fore and aft with raising and lowering of the load platform.

A specific object of this invention therefore is to provide a novel hoistable, haulage vehicle load platform having stability when elevated substantial amounts.

Another object of this invention is to provide a novel hoistable fifth wheel platform assembly employing hoisting bellows, parallelogram linkages, and stabilizer and position control means in combination.

These and other objects of the invention will be apparent upon studying the following specification in conjunction with the drawings.

BRIEF DESCRIPTION OF THE DRAWINGS

FIG. 4 is an end elevational view of the apparatus;

FIG. 5 is a side elevational view of the novel apparatus; and

FIG. 6 is a plan view of the novel apparatus.

DESCRIPTION OF THE PREFERRED EMBODIMENT

Figure 1:
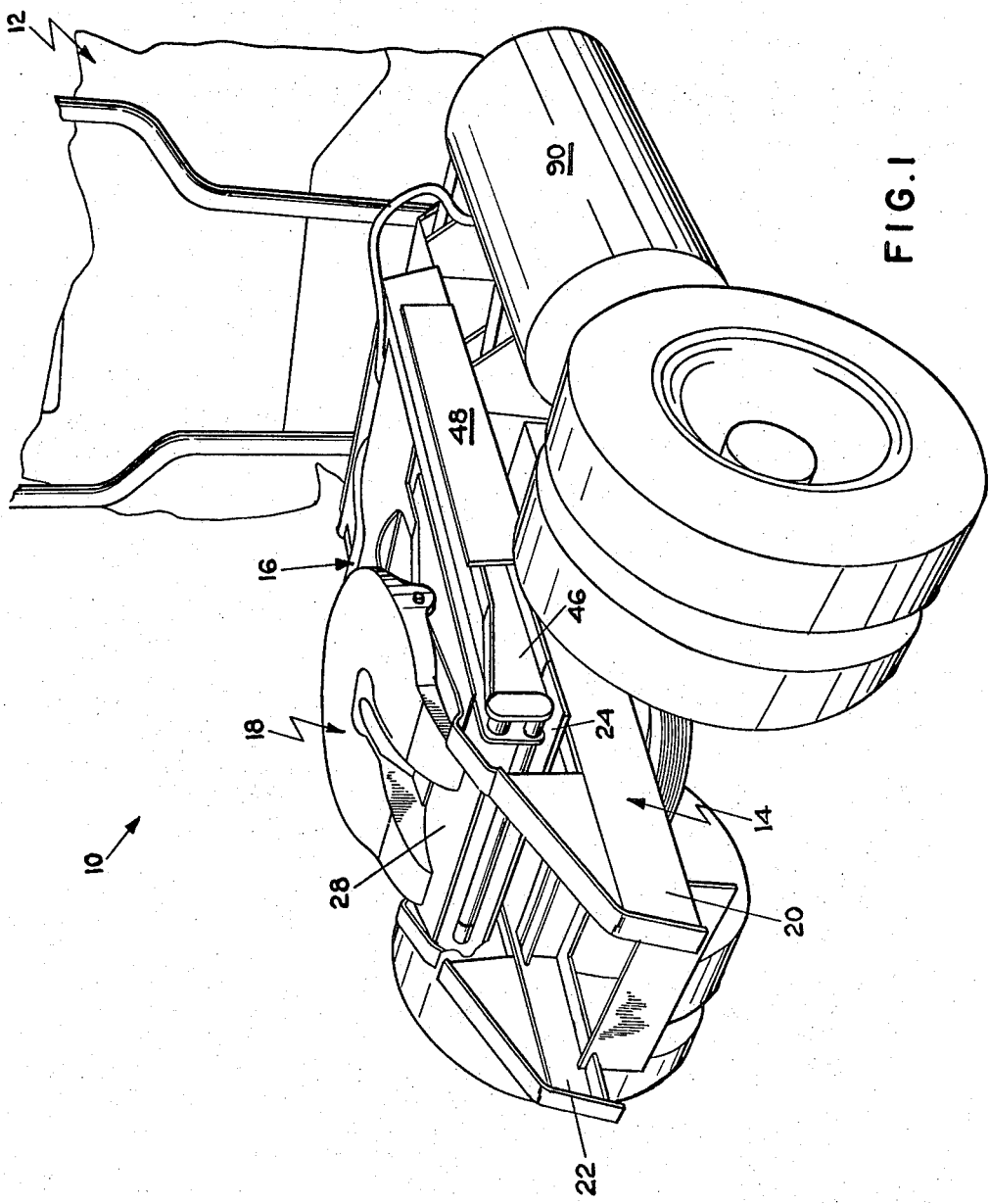
FIG. 1 is a perspective view of a truck tractor vehicle having the novel apparatus mounted thereon.

Referring now specifically to the drawings, the complete combination 10 includes a truck tractor 12 having an engine, a cab, front wheel assembly, and rear drive wheel assembly in conventional fashion, as well as a frame 14 which extends rearwardly from beneath the cab to above the rear wheel suspension mechanism. Mounted on frame 14 is the novel hoist assembly 16 for fifth wheel apparatus 18.

Frame 14 normally includes a pair of elongated, front to rear extending, laterally spaced support beams 20 and 22, normally of I-beam construction. Secured on top of these beams is a support structure or bed 24 which preferably comprises a generally rectangular plate having its opposite side edges secured as by welding to beams 20 and 22. Supported upon the generally central portion of this support platform 24 is a vertically expandable bellows hoist unit 26 composed of a series of bellows units mounted atop each other in sealed fashion in conventional manner. Because of the unusual stability of the entire structure in elevated condition, a substantial number of these bellows can be employed to hoist to a substantial height.

Mounted on top of this bellows unit 26 is a load support structure shown as platform 28. On top of platform 28 is a pair of laterally spaced mounting brackets 30 and 32 which pivotally mount fifth wheel 18 in conventional fashion using sockets 30' and 32'.

A pair of elongated plates 40 depending from the opposite sides of platform 28 form the upper horizontally extending legs of a pair of like but mirror image parallelogram linkages 42. Each linkage includes upper legs 40, front and rear shiftable legs 44 and 46, and lower horizontally extending legs 48. The lower end of rear legs 46 are pivotally secured to the rear ends of lower legs 48. The lower ends of front legs 44 are pivotally secured adjacent the front ends of legs 48 by being attached to a transversely extending pivot bar 50, which in turn is pivotally secured to the forward ends of legs 48. The upper ends of forward legs 44 are pivotally secured to the forward ends of legs 40 on the under side of platform 28. The upper ends of legs 46 are pivotally secured adjacent the rear ends of upper legs 40 by being pivotally secured to a transverse pivot rod 56 which in turn is attached to the rear ends of upper legs 40. Also secured to the opposite ends of pivot rod 56 is a pair of couplers 58, to which are pivotally attached the rear ends of a pair of elongated stabilizer bars 60 of stabilizer and position control means 59. Bars 60 extend from a position behind the fifth wheel support platform to a position in front of the fifth wheel and its platform 28. The front ends of bars 60 are pivotally attached to brackets 62 mounted on the forward ends of platform 24.

Lower legs 48 of the two pairs of parallelogram linkages are slidable fore and aft along support bed 24 by having a sliding interfit therewith. Specifically, the channel shaped structure of each leg 48 is configurated on the lower edge thereof to form a slide having a pair of shoulders 64 (FIG. 4) that fit over a generally T-shaped slide track 66 affixed to plate 24.

The forward legs 44 on the opposite sides of the structure are preferably interconnected by a rigid support plate 44' which also extends between transverse pivot rod 50 and the transversely extending pivot rod 51 secured to the forward end of platform 28.

Frame beams 20 and 22 preferably have a pair of forwardly upwardly extending diagonal ramps 80 and 82 leading up to the fifth wheel for ease of interconnection to a semi-trailer.

Figure 2:
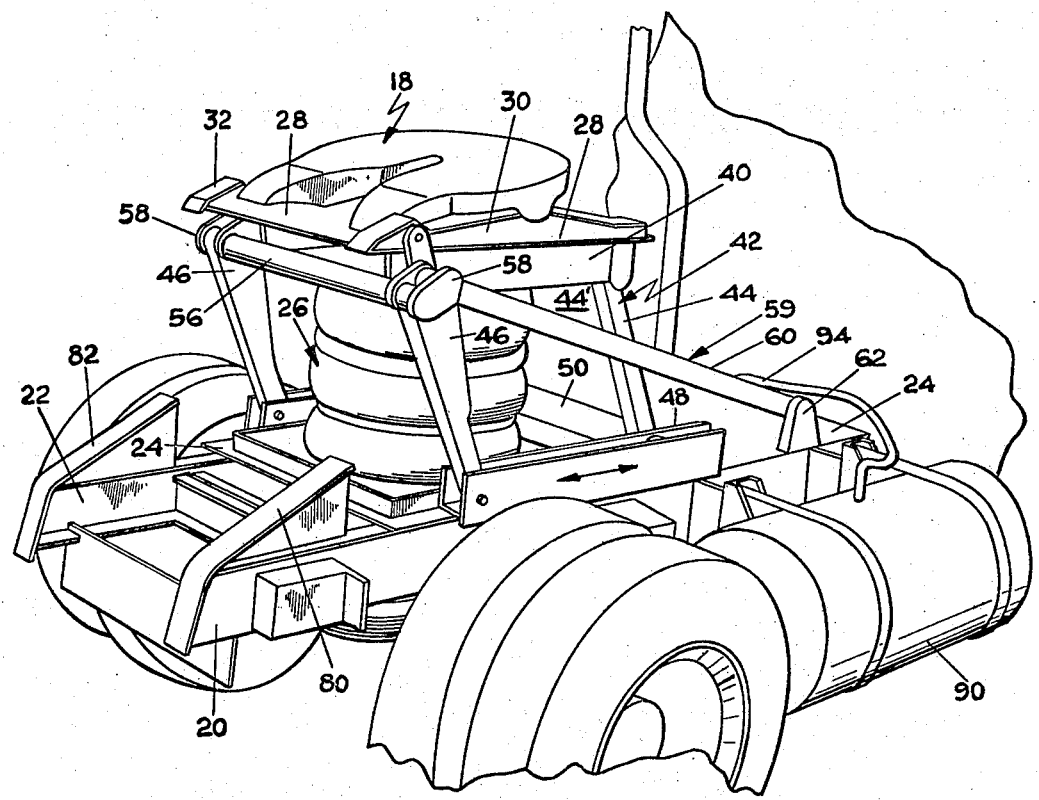
FIG. 2 is a perspective view of the apparatus in FIG. 1, in the expanded hoist condition.
Figure 3:
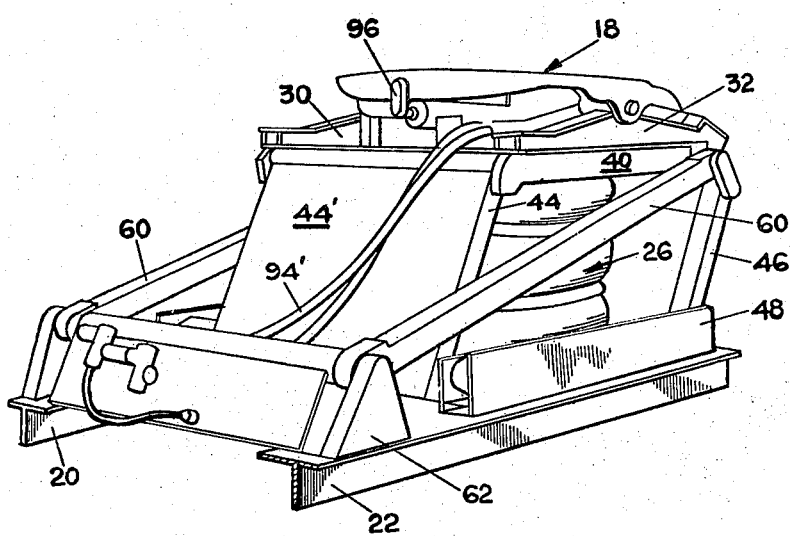
FIG. 3 is a perspective view of the apparatus in FIG. 2, viewed from the opposite direction.

In operation, the fifth wheel load support platform 28 can be raised and lowered using a suitable compressed air source such as tank 90 through suitable conduits 94 to the bellows unit. Elevation can be limited with a suitable control valve 96 (FIG. 3). During inflation of bellows unit 26 to elevate load support platform 28 above the support bed structure, position control and stabilizer links 60 cause the platform to move basically upwardly, without significant forward or rearward movement of platform 28. Hence, the bellows unit is basically undistorted in its inflation. When platform 28 is being elevated, the forward and rearward legs 44 and 46 of each of the parallelogram linkages moves from a generally horizontal condition to a generally vertical but slightly inclined diagonal position as illustrated in FIG. 2. During this parallelogram linkage shift, lower legs 48 of the parallelogram linkages slide along the track structures explained relative to FIG. 4, rearwardly during hoisting of plate 28, and forwardly during lowering of plate 28. As a consequence of this combination of features, it has been found that the fifth wheel and a semi-trailer hoisted thereon are very stable even at this substantial elevation. If a load is moved by the vehicle when the unit is elevated, linkages 42 prevent lateral shift and lateral bellows distortion. Of course they also prevent this when the unit is lowered. If a load is moved by the vehicle when the unit is elevated, stabilizer and position control means 59 prevents fore and aft shift and accompanying bellows distortion. It also does this when the unit is lowered.

Various additional advantages will undoubtedly occur to those in the art upon reviewing this disclosure. It is also conceivable that certain construction details e.g. the construction of the upper and lower platforms, and the like, could be modified to suit a particular situation without departing from the concept presented herein. In the broader aspects of the novel concept, the combination could be employed on other hauling vehicles besides a truck tractor. Further, the combination could be employed with other load engaging means than a fifth wheel. Hence, it is intended that the invention is to be limited only by the appended claims and the reasonably equivalent structures to those defined therein, rather than to the specific form of the invention set forth therein, rather than to the specific form of the invention set forth herein as illustrative and preferred.

The embodiments of the invention in which an exclusive property or privilege is claimed are defined as follows.

1. A fifth wheel assembly comprising: an affixable support bed; a fifth wheel mount above said support bed; hoist means between said support bed and said fifth wheel mount; slide means laterally astraddle of said hoist means and slidably mounted on said support bed, for forward and rearward movement thereon; parallelogram stabilizing linkage between said slide means and said fifth wheel mount, movable vertically angularly with raising and lowering of said fifth wheel mount; and vertical alignment retention means between said support bed and said fifth wheel mount to prevent significant fore and aft movement of said fifth wheel mount with raising and lowering thereof, said vertical alignment retention means comprising arms pivotally attached to said support bed and pivotally attached to said fifth wheel mount.

2. The fifth wheel assembly in claim 1 wherein said hoist means comprises vertically expandable bellows means.

3. A fifth wheel assembly comprising: support structure; a fifth wheel mount above said support structure; hoist means between said support structure and said fifth wheel mount; parallelogram linkage between said support structure and said fifth wheel mount, movable vertically angularly with raising and lowering of said fifth wheel mount; and position control means to control said fifth wheel mount relative to fore and aft movement with raising and lowering thereof; said support structure including an affixable bed and slide means slidably engaged with said bed to be movable fore and aft on said bed, with said parallelogram linkage being pivotally connected with said slide means and pivotally connected to said fifth wheel mount.

4. The fifth wheel assembly in claim 3 wherein said position control means includes vertical alignment retention means between said fifth wheel mount and said support structure to prevent significant fore and aft movement of said fifth wheel mount with raising and lowering thereof.

* * * * *